(12) United States Patent
Reiter

(10) Patent No.: US 7,344,463 B2
(45) Date of Patent: Mar. 18, 2008

(54) SPROCKET ASSEMBLY

(75) Inventor: Markus Reiter, Schweinfurt (DE)

(73) Assignee: SRAM Corporation, Chicago, IL (US)

( * ) Notice: Subject to any disclaimer, the term of this patent is extended or adjusted under 35 U.S.C. 154(b) by 463 days.

(21) Appl. No.: 10/707,539

(22) Filed: Dec. 19, 2003

(65) Prior Publication Data

US 2004/0121867 A1    Jun. 24, 2004

(30) Foreign Application Priority Data

Dec. 21, 2002    (DE)    ................ 102 60 565

(51) Int. Cl.
*F16H 55/12*    (2006.01)
(52) U.S. Cl. .................................... 474/160
(58) Field of Classification Search ........ 474/152–157, 474/160, 902–903, 77–78; D12/123; D15/5; D08/386; 280/259–260
See application file for complete search history.

(56) References Cited

U.S. PATENT DOCUMENTS

| | | | | |
|---|---|---|---|---|
| 5,085,620 A | * | 2/1992 | Nagano | ........................ 474/152 |
| 5,217,413 A | * | 6/1993 | Nagano | ........................ 474/160 |
| 5,426,997 A | * | 6/1995 | Brion | ........................... 474/160 |
| 5,480,359 A | * | 1/1996 | Tani | ............................. 474/160 |
| 5,766,106 A | | 6/1998 | Edwards | |
| 5,782,713 A | * | 7/1998 | Yang | ........................... 474/160 |
| 5,935,034 A | | 8/1999 | Campagnolo | |
| D432,054 S | * | 10/2000 | Hanamura | ................. D12/123 |
| 6,176,798 B1 | | 1/2001 | Nakamura | |
| 6,428,437 B1 | | 8/2002 | Schlanger | |
| 2003/0073531 A1 | * | 4/2003 | Tseng | ......................... 474/160 |

FOREIGN PATENT DOCUMENTS

| | | |
|---|---|---|
| DE | 296 23 671 U1 | 3/1999 |
| EP | 0 508 328 A1 | 10/1992 |
| EP | 0 510 371 A1 | 10/1992 |
| EP | 0510371 B1 | 10/1992 |
| EP | 0 619 220 A2 | 10/1994 |
| EP | 0712780 A1 | 5/1996 |
| EP | 0765802 B1 | 4/1997 |
| EP | 0849155 A2 | 6/1998 |
| EP | 1 074 462 A2 | 2/2001 |
| EP | 1 186 446 A2 | 3/2002 |
| WO | WO (93/08071 A1 * | 4/1993 |

* cited by examiner

*Primary Examiner*—Marcus Charles
(74) *Attorney, Agent, or Firm*—Milan Milosevic; Lisa Serdynski

(57) ABSTRACT

A sprocket assembly that includes at least three sprockets and a sprocket carrier having a plurality of radially extending carrier arms. The carrier arms include a first receiving surface and a second receiving surface opposite the first receiving surface. A first sprocket mounted to the first receiving surface and a second sprocket mounted to the second receiving surface. A third sprocket arranged between the first and second sprockets.

13 Claims, 4 Drawing Sheets

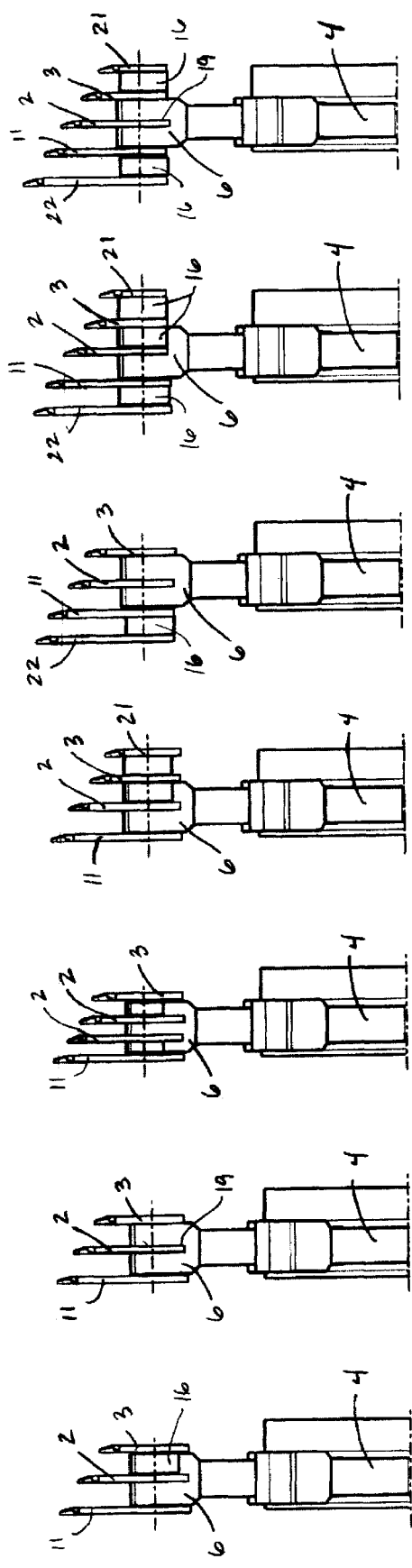

SPROCKET ASSEMBLY

BACKGROUND OF INVENTION

The present invention relates to sprocket assemblies for a bicycle, and more particularly to a sprocket assembly including a sprocket carrier, first and second sprockets mounted one on each side of the sprocket carrier and a third sprocket arranged between the first and second sprockets.

A sprocket assembly for a bicycle includes several sprockets with decreasing diameters that are supported concentrically by one or more sprocket carriers. The desire to increase the number of sprockets included in the assembly and the desire to provide a lightweight construction have placed stringent demands on the configuration of the sprocket assembly. Also, the close gear ratio configuration of the sprockets and the small differences between the diameters of adjacent sprockets place stringent demands on the sprocket assembly configuration.

The European patent EP 0 712 780 A1 discloses a sprocket assembly that includes a stepped carrier having three support arms for receiving a plurality of sprockets. The stepped carrier is supported on the largest and smallest sprockets and receives a sprocket on each step of the carrier. The largest and smallest sprockets and the carrier are joined nonrotatably to the hub and torque is transmitted through the largest and smallest sprockets to the hub from the other sprockets. The sprockets between the largest and smallest sprockets are retained on the arms of the carrier by delimiting lugs.

The European Patent EP 0 510 371 B1 discloses a sprocket carrier for mounting a plurality of sprockets. The carrier includes radially extending stepped support arms that receive the individual sprockets. Screws attach the sprockets to the support arms. To reduce weight, a back of each support arm is cut out.

The European Patent EP 0 849 155 A2 discloses a sprocket assembly having fourteen sprockets and three subassemblies. The first subassembly includes a carrier having radially extending arms that include axially offset steps for rivet attachment of the sprockets. The second subassembly includes a carrier having spokes for rivet attachment of one sprocket to each side of the carrier. The third subassembly includes individual sprockets directly connected to the hub and separated by spacers.

The European Patent EP 0 765 802 B1 discloses a sprocket assembly that includes two subassemblies wherein the first subassembly includes a carrier having radially extending arms for receiving sprockets and the second subassembly includes individual sprockets attached directly to the hub which are separated by spacers. Sprockets with small differences in tooth count are attached to both sides of the carrier by the same rivets.

The sprocket assemblies disclosed in the above patents illustrate the development from, the original, individually fitted-together sprocket assemblies to the complex sprocket assemblies having several subassemblies of sprocket carriers for receiving the individual sprockets. Potentials for improvement still exists in terms of design complexity, number of functional parts, and overall size, as well as torsional stiffness and cost reduction.

SUMMARY OF INVENTION

It is an object of the present invention to provide a lightweight but torsionally stiff sprocket assembly that is cost effective in terms of both production and assembly.

To reduce the weight of the sprocket assembly, the overall functionality of the sprocket assembly may be subdivided into a chain reception function and a sprocket carrying function. With this configuration, radial widths of the sprockets are minimized, thereby reducing the material outlay for high-load capacity teeth. Further, the number of sprocket clusters and carriers are also reduced.

One embodiment of the present invention provides a sprocket assembly that includes a sprocket carrier having a hub ring having an internal profile for transmitting torque and a plurality of carrier arms radially extending from the hub ring. The carrier arms include a first receiving surface and a second receiving surface opposite the first receiving surface. A first sprocket is mounted to the first receiving surface and a second sprocket is mounted to the second receiving surface. A third sprocket is arranged between the first and second sprockets. The third sprocket is mounted to the first or second sprocket with fastening elements and spacers disposed therebetween. Alternatively, the third sprocket may be supported in a groove extending circumferentially along an end of the carrier arms and mounted to the carrier with the same fastening element as the first or second sprocket.

The first sprocket includes a first plurality of mounting holes, the second sprocket includes a second plurality of mounting holes and the carrier arms include a third plurality of mounting holes that align with the first and second plurality of mounting holes. The first and second sprockets are mounted to the carrier arms by fastening elements extending through the first, second and third plurality of mounting holes. The first and second sprockets may include first and second plurality of radially inwardly extending mounting tabs that include the first and second plurality of mounting holes.

In another embodiment of the present invention, the hub ring of the sprocket carrier is narrow in a radial direction and includes inwardly extending driver elements of different widths for transmitting torque. For weight reduction, the carrier arms may include axially extending cutouts in a root region of the sprocket carrier or can be tapered in an axial direction. The thickness of the arms in an end region of the arm is defined by the spacing between the first, second and third sprockets and the thickness of the third sprocket. The third sprocket, like the other sprockets, possesses radially inwardly extending mounting tabs that include mounting holes. If the third sprocket is supported by one of the first and second sprockets, the third sprocket or its mounting tabs are oriented such that the third sprocket is located in front of the corresponding arm in the drive direction, thereby being supported under load. Further, if the third sprocket is supported by one of the first and second sprockets, the mounting tabs of the first or second sprockets include an additional fourth plurality of mounting holes. Another sprocket may be mounted externally on one or both of the laterally arranged first and second sprockets by a fastening element such as a rivet or screw and a spacer disposed therebetween. The required spacing of two adjacent sprockets may be achieved by using annular spacers, or by axial deformation of the mounting tabs. If a sprocket that is arranged laterally on the carrier arms supports several other sprockets, these sprockets and the spacers are retained on the sprocket on the carrier by the same fastening element that attached the sprocket to the carrier, e.g. one rivet per attachment point. The sprockets included in the sprocket assembly are arranged in order of increasing or decreasing tooth count.

According to another embodiment of the present invention, the number of sprockets included in the sprocket assembly may be expanded by using installation elements that laterally attach to the carrier arms instead of to the first or second sprocket. Each installation element can carry two sprockets, which are held or riveted on laterally by fastening elements and spacers disposed therebetween. The sprocket assembly can include a minimum of three sprockets, four with one installation element, five with two installation elements, and, if the installation elements are configured as sprockets, as many as seven sprockets may be included.

The installation elements include mounting holes on various radii, which are aligned with the mounting holes on the carrier arms and with the mounting holes on the sprockets. The installation elements may be annular disks or rings that can be fitted on both sides of the carrier arms with sprockets having different tooth counts, thereby functioning as a radial extension of the sprocket carrier. The installation elements, or one installation element and one sprocket, are retained on each side of the carrier arms with one fastening element, preferably a rivet, per attachment point. The two sprockets arranged on the installation element are likewise retained by one shared rivet per attachment point. The use of the installation elements allows more sprockets to be included in the sprocket assembly. If, in addition, one or possible both installation elements are equipped with a toothed contour and a further sprocket is arranged between the installation elements in the groove extending circumferentially along the end of the carrier arms, up to seven sprockets can be installed on one sprocket carrier. If further sprockets are arranged on both sides of the third sprocket, the result is then a sprocket assembly having nine sprockets. The required thickness of the carrier arm end region of a sprocket carrier fitted with nine sprockets is made up of five sprocket thicknesses and six sprocket spacings. The number of sprockets that may be installed on a sprocket carrier may vary from three to nine.

In contrast to the prior art sprocket assemblies already discussed, the present invention provides a sprocket assembly that is lightweight and cost effective which is accomplished by using only one sprocket carrier and additional individual sprockets. The axial length of a sprocket carrier having a minimum of three sprockets is larger and more stable than a sprocket carrier having only two sprockets. If, however, as many as seven sprockets are arranged on one sprocket carrier, the external length of the sprocket assembly is increased because of the sprocket thickness and the required spacers, although this need does not necessarily affect the hub length of the sprocket carrier. A sprocket assembly including one sprocket carrier and individual sprockets having low tooth counts can be arranged to have a much shorter hub length than one made up of conventional sprocket carriers. The space gained inside the large sprockets or inside the installation ring that carries the large sprockets can be used for other purposes, e.g. for hub mounting. Because of the protruding large sprocket or the corresponding installation ring, it is an obvious step to move the largest sprocket closer to the wheel spokes in order, for a given fork width, to accommodate more sprockets or to achieve a narrower hub.

The present invention provides a simple configuration of a sprocket assembly having three sprockets, two outer sprockets and one inner sprocket between the two outer sprockets that is attached to one of the outer sprockets or directly to the carrier arm. The present invention also provides a more complex sprocket assembly configuration having more than three sprockets by mounting additional sprockets either to the original three sprockets or on installation elements.

The weight of the sprocket assembly of the present invention is reduced by having one sprocket carrier and nine sprockets as compared to a conventional sprocket assembly having several sprocket carriers each fitted with two sprockets. In the present invention, the larger sprockets installed directly or indirectly on the sprocket carrier project axially beyond the root region of the sprocket carrier. The space located between these sprockets allow the use of a larger bearing or allow the axial length of the hub to be larger because the hub may project into the open space beneath the large sprockets. Another advantage of the present invention is that the replaceability of the sprockets is simplified by having the sprockets or the installation elements attached to the carrier by detachable fastening elements such as screws.

These and other features and advantages of the invention will be more fully understood from the following description of certain embodiments of the invention, taken together with the accompanying drawings.

BRIEF DESCRIPTION OF DRAWINGS

In the drawings:

FIGS. 4-16 are cross-sectional views of sprocket assemblies having at least three sprockets.

DETAILED DESCRIPTION

Figure 1:
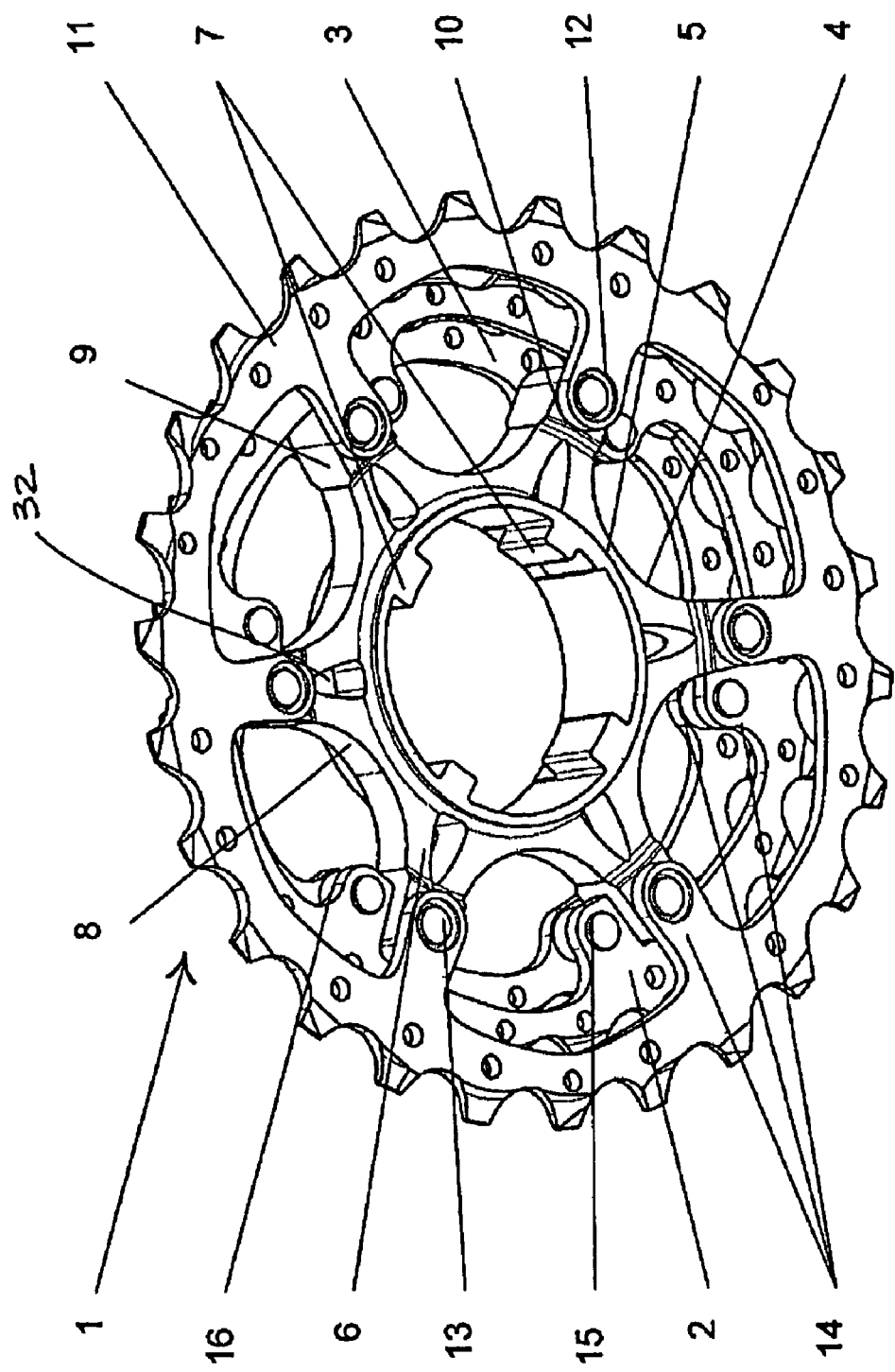
FIG. 1 is a perspective view of a sprocket assembly having three sprockets in accordance with one embodiment of the present invention.
Figure 2:
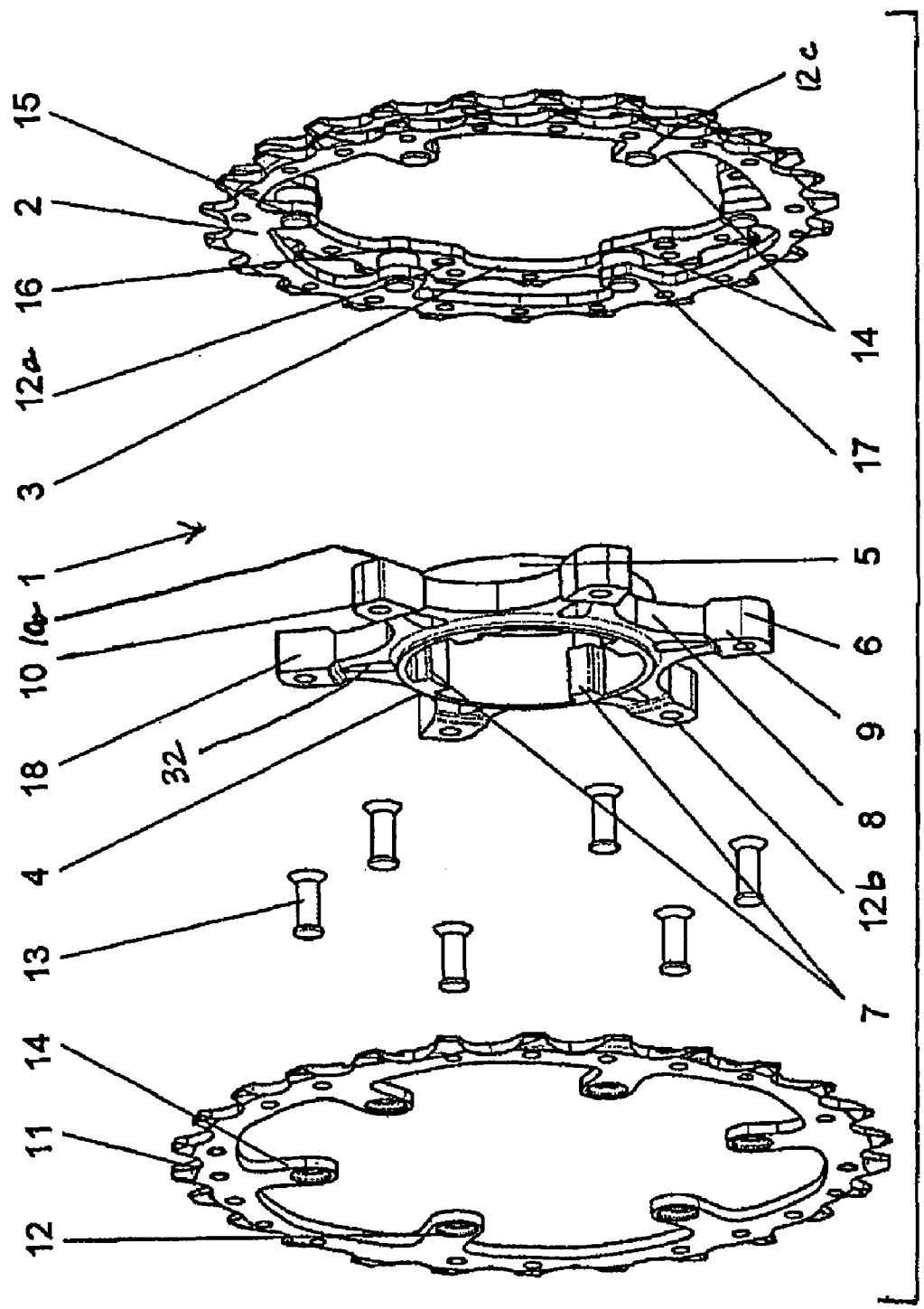
FIG. 2 is an exploded view of the sprocket assembly of FIG. 1.

FIGS. 1 and 2 illustrate a sprocket assembly 1 for a bicycle in accordance with one embodiment of the present invention. The sprocket assembly 1 generally includes a sprocket carrier 4 for receiving at least three sprockets 2, 3 and 11. The carrier 4 includes a hub ring 5 and a plurality of carrier arms 6 wherein the hub ring 5 is wider than the plurality of carrier arms 6. For positive torque transfer, the hub ring 5 has driver elements 7 of differing widths. Each carrier arm 6 tapers from a root region 8 of the carrier 4 to an end region 9 of the arm 6, while the thickness of the root region 8 is less than the end region 9 of the arm 6. The carrier arm 6 includes a first receiving surface 10 and a second receiving surface 10a opposite the first receiving surface 10. Although, FIGS. 1 and 2 show all of the plurality of carrier arms having the first and second receiving surfaces, the phrase "plurality of" does not mean all of the carrier arms, but may mean any plurality of carrier arms. First and second sprockets 11, 3 are mounted to the first and second receiving surfaces 10, 10a respectively. To reduce the weight of the carrier 4, the carrier arms 6 having axially extending cutouts 32. The spacing between the two receiving surfaces 10, 10a is dictated by the thickness of a third sprocket 2 and the necessary sprocket spacing between the sprockets 2, 3, 11.

The first and second sprockets 11, 3 include first and second plurality of mounting holes 12, 12a, respectively, and the carrier arms 6 include a third plurality of mounting holes 12b that align with the first and second plurality of mounting holes 12, 12a. The first and second sprockets 11, 3 are mounted to the carrier arms 6 with a common fastening element 13, in this embodiment, a rivet, extending through the first, second and third plurality of mounting holes 12, 12a, 12b. Although, FIGS. 1 and 2 show the fastening elements extending through all of the plurality of mounting holes, the phrase "plurality of" does not mean all of the mounting holes, but may mean any plurality of mounting holes. The sprockets 2, 3, 11 are perforated to reduce weight of the sprocket assembly and include radially inwardly extending mounting tabs 14. The mounting tabs 14 on the second sprocket 3 include the second plurality of mounting holes 12a and a fourth plurality of mounting holes 12c wherein the second plurality of mounting holes 12a receive a fastening element 13 for attaching to the carrier arm 6 and the fourth plurality of mounting holes 12c receive the fastening element 13 for attaching the third sprocket 2 to the second sprocket 3. To ensure that there is even spacing between the third sprocket 2 and the second sprocket 3 spacers 16 are used between the sprockets 2, 3. The third sprocket 2 is supported on the carrier arms 6 by the mounting tabs 14, so that the shear stress on the rivet 15 is reduced.

Looking to FIG. 2, the sprockets 2, 3, 11 are pre-assembled by rivets 15 and spacers 16. FIG. 2 shows the mounting holes 12a, still open, in the mounting tabs 14 of the second sprocket 3 ready to receive the fastening elements 13, which in this embodiment are six rivets. A guide edge 17 is disposed on the mounting tab 14 of the third sprocket 2 to support the torque on a corresponding support contour 18 on the carrier arm 6 of the sprocket carrier 4.

The sprocket carrier 4 includes six carrier arms 6 radially extending from the hub ring 5. The hub ring 5 is substantially wider in the axial direction than carrier arms 6. The end region 9 is wider than root region 8, and includes the mounting holes 12b for receiving fastening element 13. The lateral receiving surfaces 10, 10a for mounting the first and second sprockets 11, 3 are located on the sides of the end region 9 of each carrier arm 6. The thickness of the end region 9 depends on the number of sprockets mounted to the sprocket carrier 4. In the case of three sprockets, the thickness of the end region 9 is equal to two times the sprocket spacing plus the sprocket thickness.

Figure 3:
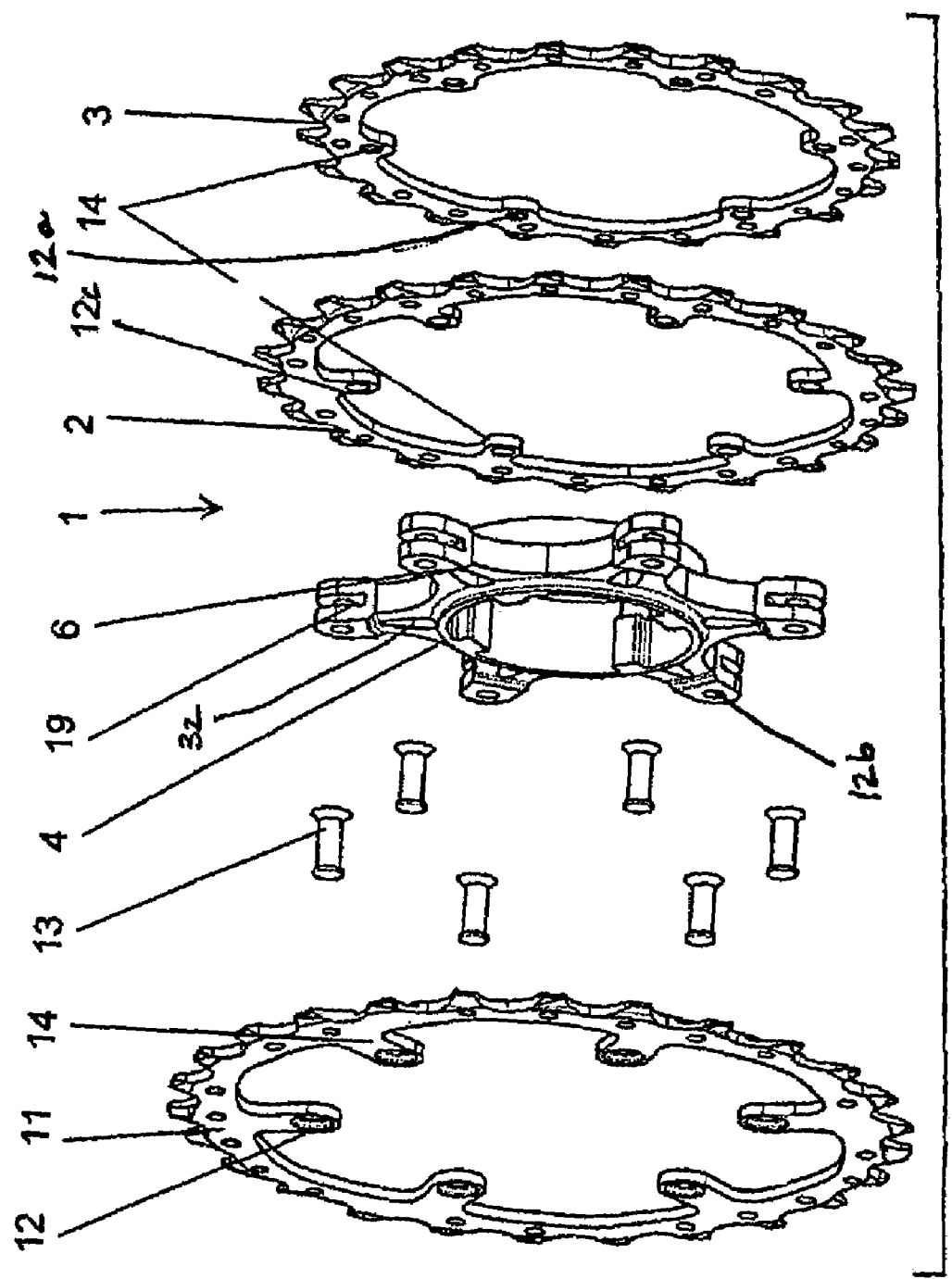
FIG. 3 is an exploded view of a sprocket assembly in accordance with another embodiment of the present invention.

FIG. 3 illustrates another embodiment of the present invention wherein the sprocket carrier 4 includes a groove 19 extending circumferentially along an end of the carrier arms 6 for receiving the third sprocket 2. The sprockets 2, 3, 11 have radially extending mounting tabs 14 and mounting holes 12, 12a, 12c and are mounted to the carrier arms 6 by a common fastening element 13, in the form of a rivet, extending the mounting holes 12, 12a, 12c. The mounting holes 12 of the first sprocket 11 and the mounting holes 12a the second sprocket 3 are recessed on an outer side to receive the rivet heads.

FIGS. 4-16 illustrate several alternative embodiments of the present invention. The number of sprockets included in the various sprocket assemblies range from three to nine. Each embodiment has the basic sprocket assembly: the sprocket carrier 4; the first and second sprockets 11, 3 laterally mounted to the first and second receiving surfaces 10, 10a of the carrier 4 and the third sprocket 2 arranged between the first and second sprockets 11, 3. The sprockets 2, 3, 11 are directly mounted to the carrier 4 or indirectly mounted to the carrier 4 by installation elements 20 or spacers 16.

In FIG. 4, the first and second sprockets 11, 3 are riveted externally onto the sprocket carrier 4. The third sprocket 2 is mounted to the second sprocket 3 by fastening elements 13 and spacers 16 disposed therebetween.

In FIG. 5, the third sprocket 2 is supported in the circumferential groove 19 and is mounted to the carrier arms 6 of the sprocket carrier 4 by the same fastening element 13 that mounts the first and second sprockets 11, 3 to the carrier 4.

In FIG. 6, two additional third sprockets 2 are arranged between the first and second sprockets 11, 3. The two additional sprockets 2 are mounted to the first and second sprockets, respectively, by a fastening element 13 and a spacer 16 disposed therebetween.

In FIG. 7, two sprockets 2, 21 are mounted one on each side of the second sprocket 3 by fastening elements 13 and spacers 16 disposed therebetween. The same fastening elements 13 are used to mount the two sprockets 2, 21 to the mounting tabs 14 of the second sprocket 3. Alternatively, the smallest sprocket can also be mounted on the sprocket carrier, together with the second sprocket mounted directly to the sprocket carrier, using the fastening element extending through the carrier arm.

In FIG. 8, in addition to the first sprocket 11 arranged on the carrier arm 6, an even larger sprocket 22 than sprocket 11 is mounted on the sprocket carrier 4 by spacers 16 and fastening elements 13 which also secure the other sprockets 2, 3, 11.

FIGS. 9 and 10 each illustrate a sprocket assembly having five sprockets. An even larger sprocket 22 than sprocket 11 and an even smaller sprocket 21 than sprocket 3 are mounted to the sprocket carrier 4 with spacers 16 between the sprockets 3, 11, 21, 22. The sprockets 2, 3, 11, 21, 22 are mounted to the carrier 4 with shared fastening elements 13.

FIG. 11 shows a sprocket assembly having four sprockets: the second sprocket 3, the third sprocket 2, and instead of the first sprocket 11, an installation element 20 in the form of an installation ring, having mounting holes distributed over two partial circles, is mounted directly to the receiving surface 10 of the carrier arm 6. Sprockets 23, 24 are mounted one on each side of the installation ring 20 by fastening elements and spacers disposed therebetween.

In FIG. 12 shows a sprocket assembly wherein both the first sprocket 11 and the second sprocket 3 are replaced by installation elements 20. Both of the installation elements 20 support sprockets 25, 26 on both sides, held in position by spacers 16.

In FIGS. 13 and 14 shows a sprocket assembly wherein one or both of the installation elements 20 are sprockets 27 having radially inwardly directed mounting tabs that are used as carriers to allow the sprockets 23, 24, 25, 26 to be mounted one on each side of the sprockets 27. Spacers 16 are arranged between the sprockets 27 and the sprockets 23, 24, 25, 26.

FIGS. 15 and 16 show sprocket assemblies having eight and nine sprockets, respectively. In FIG. 15, the third sprocket 2 has been replaced with an installation element 20 and in FIG. 16 the installation element 20 has a sprocket contour 28 or is a sprocket. In both FIGS. 15 and 16, two sprockets 29, 30 are mounted one on each side of either the installation element 20 or the sprocket 28.

As shown in these figures, a modularly constructed sprocket carrier can be assembled, using very few components, into sprocket assemblies having three to nine sprockets.

While this invention has been described by reference to several embodiments, it will be understood that numerous changes could be made within the spirit and scope of the inventive concepts described. Accordingly, it is intended that the invention not be limited to the disclosed embodiments, but that it include the full scope permitted by the language of the of the following claims.

The invention claimed is:

1. A sprocket assembly including at least three sprockets having different tooth counts, the sprocket assembly comprising:
   a sprocket carrier including a hub ring having an internal profile for transmitting torque, a plurality of carrier arms radially extending from the hub ring, the carrier arms having a first receiving surface and a second receiving surface opposite the first receiving surface;
   first and second sprockets including first and second plurality of mounting holes, respectively, for mounting to the first and second receiving surfaces, respectively, the carrier arms including a third plurality of mounting holes aligned with the first and second plurality of mounting holes of the first and second sprockets, the first and second sprockets mounted to the carrier arms by a common fastening element; and
   a third sprocket arranged between the first and second sprockets, one of the first and second sprockets including a fourth plurality of mounting holes for mounting the third sprocket to one of the first and second sprockets.

2. The sprocket assembly of claim 1, wherein the first sprocket includes a first plurality of radially inwardly extending mounting tabs including the first plurality of mounting holes, the second sprocket including a second plurality of radially inwardly extending mounting tabs including the second plurality of mounting holes.

3. The sprocket assembly of claim 2, wherein additional sprockets are mounted to the mounting tabs of the first and second sprockets with fastening elements and spacers disposed therebetween.

4. The sprocket assembly of claim 1, wherein the fastening element is one of a screw and a rivet.

5. The sprocket assembly of claim 1, wherein the third sprocket is mounted to the carrier arms with a spacer disposed therebetween using the same fastening elements to mount the first and second sprockets to the carrier arms.

6. The sprocket assembly of claim 1, wherein the third sprocket includes a fifth plurality of mounting holes for mounting to the carrier arms.

7. The sprocket assembly of claim 6, wherein the third sprocket includes a third plurality of radially inwardly extending mounting tabs including the fifth plurality of mounting holes for mounting to the carrier arms, the third sprocket supported in the chain tension direction by the mounting tabs attached to the carrier arms.

8. The sprocket assembly of claim 1, wherein the carrier arms include at least one groove for receiving the third sprocket, the groove extending circumferentially along an end of the carrier arms, the groove located between the first and second receiving surfaces, the first, second and third sprockets mounted to the carrier arms with a common fastening element.

9. The sprocket assembly of claim 8, wherein the fastening element is one of a screw and a rivet.

10. The sprocket assembly of claim 1, wherein the third sprocket has a lower tooth count than the first sprocket and a higher tooth count than the second sprocket.

11. The sprocket assembly of claim 1, wherein the carrier arms have a root region and an end region, the arms including axially extending cutouts in the root region.

12. The sprocket assembly of claim 11, wherein a width of the carrier arms is narrower in the root region than the end region, a thickness of the carrier arms being substantially equal to the sprocket spacings plus a thickness of the third sprocket.

13. The sprocket assembly of claim 1, wherein the carrier arms have a root region and an end region, a width of the carrier arms is narrower in the root region than in the end region, a thickness of the carrier arms substantially equal to the sprocket spacings plus a thickness of the third sprocket.

* * * * *

(12) INTER PARTES REEXAMINATION CERTIFICATE (0221st)
United States Patent
Reiter

(10) Number: US 7,344,463 C1
(45) Certificate Issued: Dec. 28, 2010

(54) SPROCKET ASSEMBLY

(75) Inventor: Markus Reiter, Schweinfurt (DE)

(73) Assignee: SRAM Deutschland GmbH, Schweinfurt (DE)

Reexamination Request:
No. 95/001,126, Dec. 1, 2008

Reexamination Certificate for:
Patent No.: 7,344,463
Issued: Mar. 18, 2008
Appl. No.: 10/707,539
Filed: Dec. 19, 2003

(30) Foreign Application Priority Data

Dec. 21, 2002 (DE) .......................................... 10260565

(51) Int. Cl.
*F16H 55/12* (2006.01)

(52) U.S. Cl. ....................................................... 474/160
(58) Field of Classification Search ................... 474/160, 474/164, 902, 903
See application file for complete search history.

(56) References Cited

U.S. PATENT DOCUMENTS

| 5,426,997 A | 6/1995 | Brion |
| 5,809,844 A | 9/1998 | Durham |
| 6,102,821 A | 8/2000 | Nakamura |

FOREIGN PATENT DOCUMENTS

| EP | 510371 A1 | 10/1992 |
| EP | 1074462 B1 * | 2/2001 |
| JP | 59-165253 U * | 11/1984 |

* cited by examiner

*Primary Examiner*—Jimmy G Foster

(57) ABSTRACT

A sprocket assembly that includes at least three sprockets and a sprocket carrier having a plurality of radially extending carrier arms. The carrier arms include a first receiving surface and a second receiving surface opposite the first receiving surface. A first sprocket mounted to the first receiving surface and a second sprocket mounted to the second receiving surface. A third sprocket arranged between the first and second sprockets.

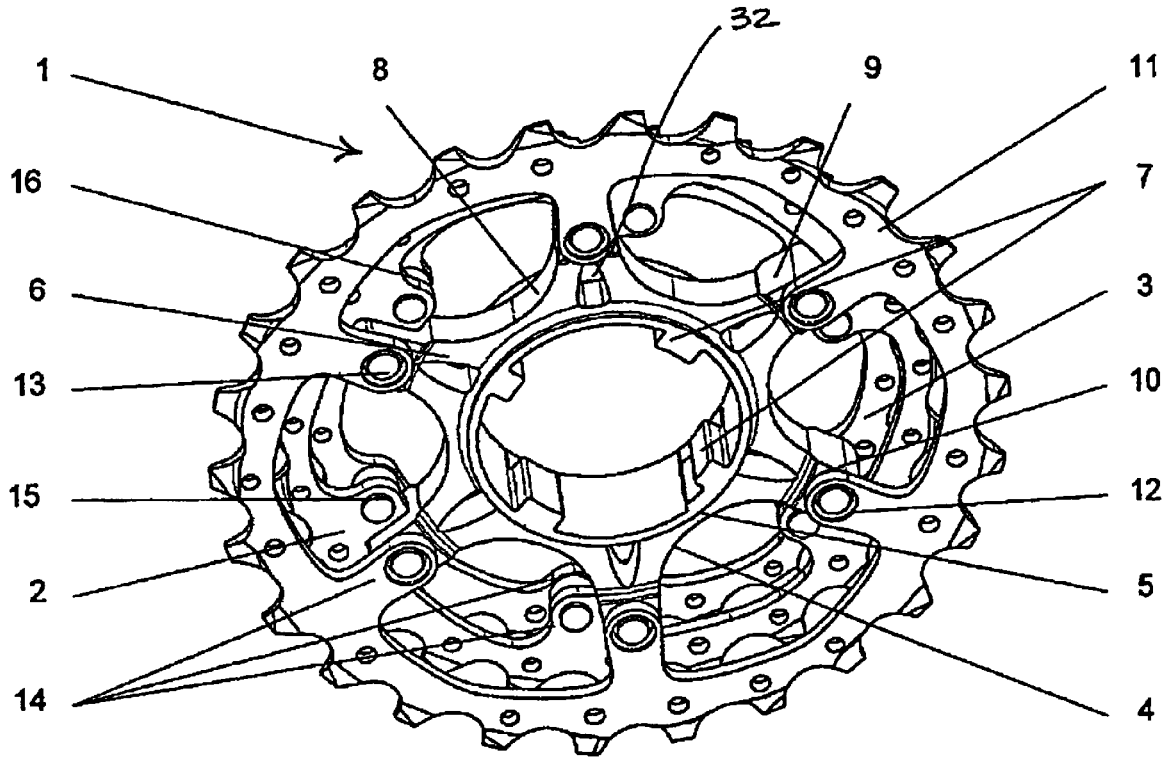

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 5, 8 and 9 are cancelled.

Claim 1 is determined to be patentable as amended.

Claims 2-4, 6, 7 and 10-13, dependent on an amended claim, are determined to be patentable.

1. A sprocket assembly including at least three sprockets having different tooth counts, the sprocket assembly comprising:
   a sprocket carrier including a hub ring having an internal profile for transmitting torque, a plurality of carrier arms radially extending from the hub ring, the carrier arms having a first receiving surface and a second receiving surface opposite the first receiving surface;
   first and second sprockets including first and second plurality of mounting holes, respectively, for mounting to the first and second receiving surfaces, respectively, the carrier arms including a third plurality of mounting holes aligned with the first and second plurality of mounting holes of the first and second sprockets[, the first and second sprockets mounted to the carrier arms by a common fastening element]; [and]
   *a first plurality of common fastening elements extending through the first, second and third plurality of mounting holes, mounting the first and second sprockets to the carrier arms;*
   a third sprocket arranged between the first and second sprockets, one of the first and second sprockets including a fourth plurality of mounting holes for mounting the third sprocket to one of the first and second sprockets; *and*
   *a second plurality of fastening elements discrete from the first plurality of common fastening elements extending through the fourth plurality of mounting holes, mounting the third sprocket to one of the first and second sprockets, the second plurality of fastening elements not extending through the carrier arms.*

\* \* \* \* \*